(12) United States Patent
Oguchi et al.

(10) Patent No.: US 9,508,012 B2
(45) Date of Patent: Nov. 29, 2016

(54) EXTRACTION METHOD AND DEVICE

(71) Applicant: FUJITSU LIMITED, Kawasaki-shi, Kanagawa (JP)

(72) Inventors: Atsushi Oguchi, Kawasaki (JP); Susumu Endo, Kawasaki (JP); Takayuki Baba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/633,611

(22) Filed: Feb. 27, 2015

(65) Prior Publication Data

US 2015/0262017 A1    Sep. 17, 2015

(30) Foreign Application Priority Data

Mar. 17, 2014 (JP) ................. 2014-054206

(51) Int. Cl.
G06K 9/66 (2006.01)
G06K 9/00 (2006.01)
G06F 17/30 (2006.01)

(52) U.S. Cl.
CPC ..... *G06K 9/00744* (2013.01); *G06F 17/30787* (2013.01); *G06K 2009/00738* (2013.01)

(58) Field of Classification Search
CPC ............... G06K 9/00744; G06K 2009/00738; G06F 17/30787
USPC ........................................................ 382/190
See application file for complete search history.

(56) References Cited

U.S. PATENT DOCUMENTS

| | | | |
|---|---|---|---|
| 6,160,950 | A | 12/2000 | Shimazaki et al. |
| 8,068,719 | B2 | 11/2011 | Chen |
| 2005/0195331 | A1 | 9/2005 | Sugano et al. |
| 2006/0059120 | A1 | 3/2006 | Xiong et al. |

FOREIGN PATENT DOCUMENTS

| | | |
|---|---|---|
| EP | 1 278 134 A2 | 1/2003 |
| JP | 2004-509529 | 3/2004 |
| JP | 2005-252860 | 9/2005 |
| JP | 2008-511186 | 4/2008 |
| WO | WO 02/23891 A2 | 3/2002 |
| WO | WO 02/23891 A3 | 3/2002 |

OTHER PUBLICATIONS

Otsuka et al: "An Enhanced Video Summarization System using Audio Features for a Personal Video Recorder", IEEE, 2006.*
Extended European Search Report dated Jun. 26, 2015 in corresponding European Patent Application No. 15156933.2.
Otsuka et al., "An Enhanced Video Summarization System using Audio Features for a Personal Video Recorder", IEEE Transactions on Consumer Electronics, vol. 52, No. 1, Feb. 2006, pp. 168-172.

(Continued)

*Primary Examiner* — Ruiping Li
(74) *Attorney, Agent, or Firm* — Staas & Halsey LLP

(57) ABSTRACT

An extraction device includes a processor that executes a procedure. The procedure includes identifying, as a video data portion including a scene of interest in a sports game, a portion of, or all of, captured images of the sports game that correspond to a period in which audio data obtained by collecting sound from the sports game exhibits relatively loud sound, or a period in which the audio data exhibits sound louder than a specific loudness.

14 Claims, 11 Drawing Sheets

(56) References Cited

OTHER PUBLICATIONS

Chen et al., "Exciting Event Detection Using Multi-level Multimodal Descriptors and Data Classification", Proceedings of the Eighth IEEE International Symposium on Multimedia, 2006, 8 pp.

Espacenet English Abstract of Japanese Publication No. 2008-511186, Published Apr. 10, 2008.
Espacenet English Abstract of Japanese Publication No. 2005-252860, Published Sep. 15, 2005.
Espacenet English Abstract of Japanese Publication No. 2004-509529, Published Mar. 25, 2004.

* cited by examiner

EXTRACTION METHOD AND DEVICE

CROSS-REFERENCE TO RELATED APPLICATION

This application is based upon and claims the benefit of priority of the prior Japanese Patent Application No. 2014-054206, filed on Mar. 17, 2014, the entire contents of which are incorporated herein by reference.

FIELD

The embodiments discussed herein are related to a recording medium storing an extraction program, an extraction method, and an extraction device.

BACKGROUND

Hitherto, services exist that distribute footage captured of a sports game both as a live distribution, and as a distribution of Video On Demand (VOD) content. In such services, sometimes there are occasions when the identification from footage is desired, for example, of scenes of interest such as scenes in which a point is scored.

For this, a scene of interest is recognized as being when a sharp rise in sound volume is detected in audio data corresponding to footage.

There has also been a proposal to identify highlight segments in video including a frame sequence.

RELATED PATENT DOCUMENTS

Japanese National Publication of International Patent Application No. 2008-511186

SUMMARY

According to an aspect of the embodiments, a non-transitory recording medium stores an extraction program that causes a computer to execute a process. The process includes identifying, as a video data portion including a scene of interest in a sports game, a portion of, or all of, captured images of the sports game that correspond to a period in which audio data obtained by collecting sound from the sports game exhibits relatively loud sound, or a period in which the audio data exhibits sound louder than a specific loudness.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Detailed explanation follows below regarding examples of exemplary embodiments of the technology disclosed herein, with reference to the drawings. In each of the exemplary embodiments below, explanation is given regarding an example in which an extraction device of the technology disclosed herein is applied to a footage distribution system that distributes captured footage of a soccer match.

First Exemplary Embodiment

Figure 1:
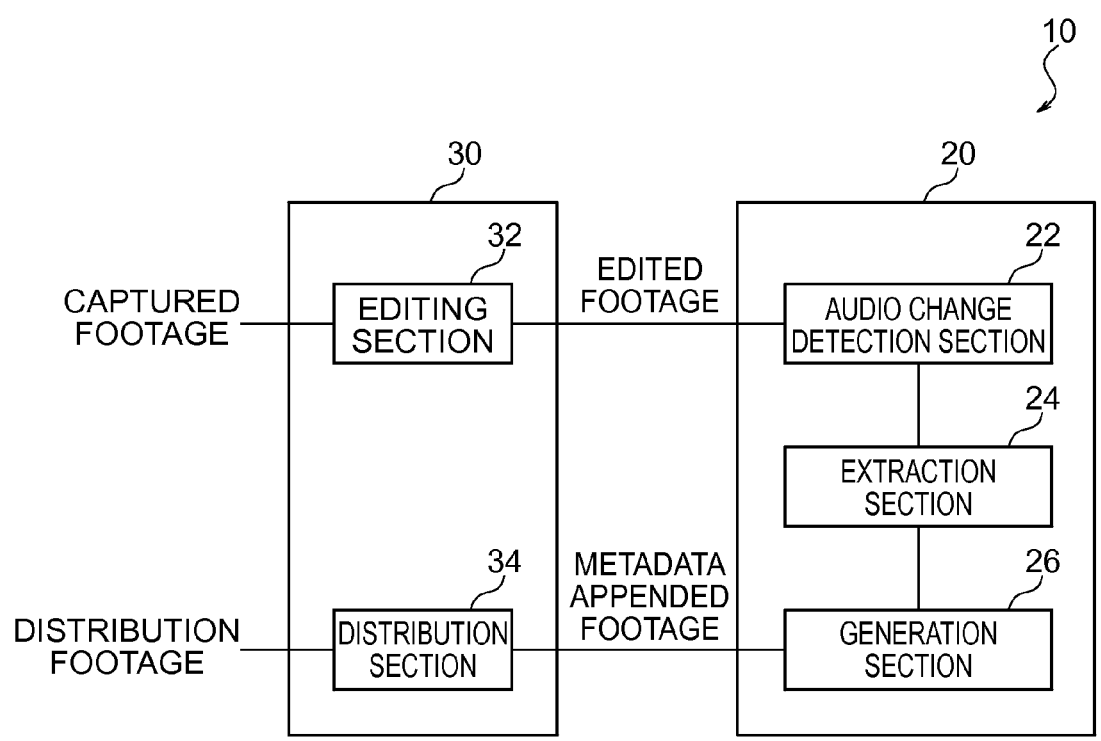
FIG. 1 is a functional block diagram illustrating a schematic configuration of a footage distribution system according to a first exemplary embodiment.

As illustrated in FIG. 1, a footage distribution system 10 according to a first exemplary embodiment includes an extraction device 20 and a distribution device 30. The extraction device 20 and the distribution device 30 are mutually connected through a network. In the footage distribution system 10, footage appended with metadata indicating scenes of interest extracted by the extraction device 20 is distributed by the distribution device 30 to a specified terminal through the network. The extraction device 20 includes an audio change detection section 22, an extraction section 24, and a generation section 26. Note that the audio change detection section 22 and the extraction section 24 are examples of identification sections of the technology disclosed herein. The distribution device 30 includes an editing section 32, and a distribution section 34.

First, detailed description is given regarding each section of the distribution device 30.

The editing section 32 acquires captured footage of a soccer match (referred to as "captured footage" hereafter). Note that in the present exemplary embodiment, the footage is media including video data and audio data. The video data included in the captured footage is captured at a frame rate such as 30 fps or 60 fps, and includes plural frames. Each of the frames is associated with time data indicating the elapsed time since capture of the captured footage started. The captured footage includes audio data including audio such as cheering in the match stadium, and audio of commentators, live reports, and the like. The audio data is time sequenced data indicating a sound volume level for respective sampling points, and at each sampling point, the audio data is associated with time data that synchronizes with time data associated with each frame in the video data, such that the audio data and the video data are synchronized with each other.

Figure 2:
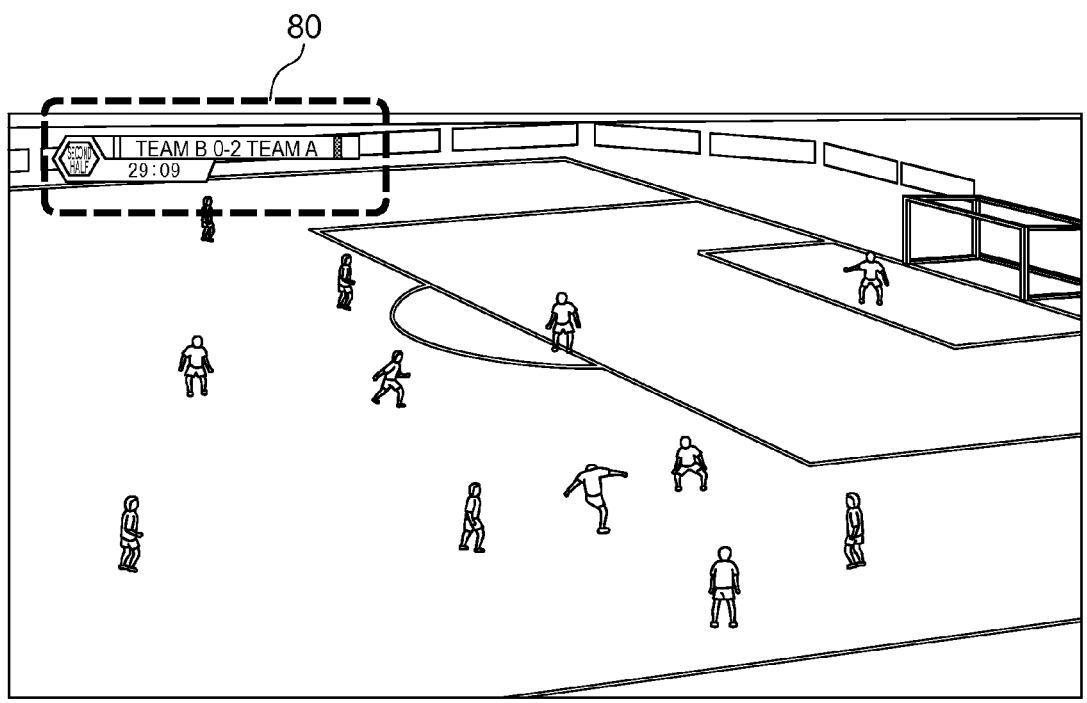
FIG. 2 is a diagram for explaining an example of editing.

The editing section 32 applies editing instructions, instructed by an operation by an operator using a display device and an input device, not illustrated in the drawings, to each frame in the video data included in the captured footage using image processing. Editing instructions include, for example, adding an overlay 80 displaying a game state as illustrated in FIG. 2. Below, footage in which editing on the video data included in the captured footage has been performed by the editing section 32 is referred to as "edited footage". The editing section 32 transmits the edited footage to the extraction device 20.

The distribution section 34 acquires footage to which metadata generated by the extraction device 20 has been appended (referred to as "metadata appended footage" hereafter; detailed description given below). The distribution section 34 converts the metadata appended footage to distribution footage according to a specified standard, and distributes the distribution footage to the distribution destination terminal (omitted from illustration in the drawings).

Next, detailed description is given regarding each section of the extraction device 20.

The audio change detection section 22 acquires the edited footage transmitted from the distribution device 30. The audio change detection section 22 calculates change amounts in the sound volume level of the audio data included in the edited footage. For example, the audio change detection section 22 may calculate the difference or ratio of an average value of the sound volume level at respective sampling points included in a specific interval, and the average value of the sound volume level at respective sampling points included in a specific interval immediately before, as the sound volume change amount. Moreover, the audio change detection section 22 detects as start points, points in time (sampling points) at which the calculated change amount in the sound volume has exceeded a predetermined change amount threshold value $th_c$.

For example, the volume of cheering and the like usually rises suddenly in the game stadium at the start time of scenes of interest such as goal scenes, foul scenes, scenes in which defense switches to attack such as at a successful intercept or the like, and disappointed near miss scenes. Accordingly, an interval short enough that sudden changes to the sound volume level can be captured is set as the specific interval when calculating sound volume level change amounts. The change amount threshold value $th_c$ is preset based on the change amount of sound volume level in audio data corresponding to scenes of interest in past game footage.

Figure 3:
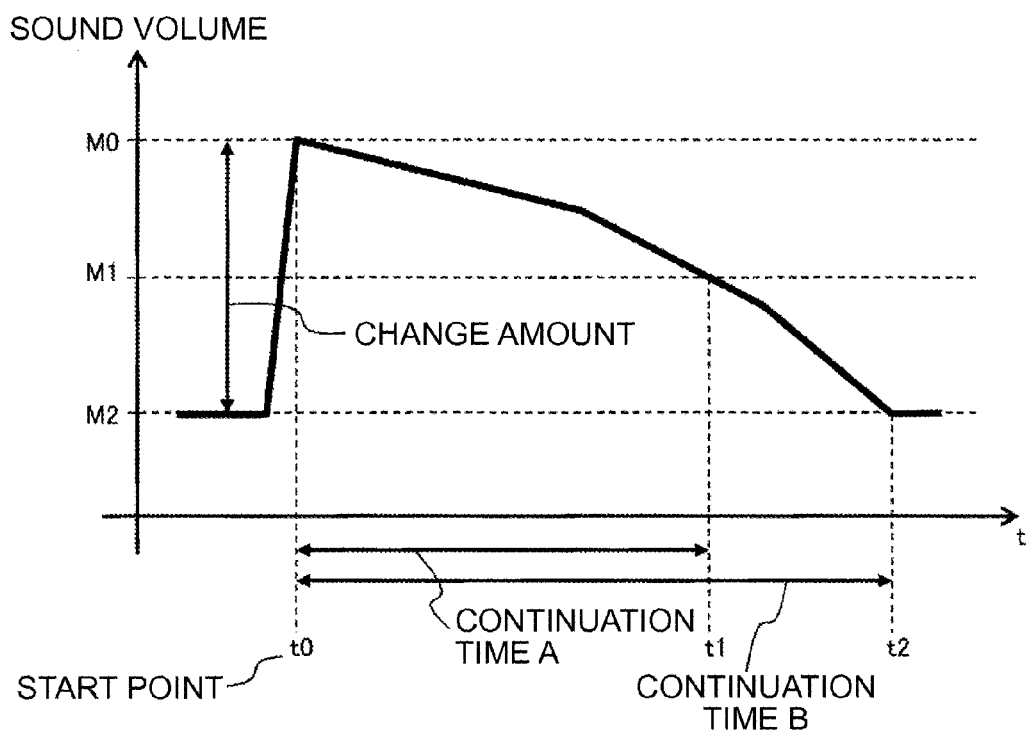
FIG. 3 is a diagram for explaining a continuation time.

The extraction section 24 determines a continuation time for which the sound volume is continually a specific level or greater from a start point detected by the sound change detection section 22. The volume of the cheering or the like tends to be continuous for a specific time or longer after suddenly rising in scenes of interest. Accordingly, the continuation time, for which the sound volume is the specific level or greater, is determined such that such a trend can be captured. The specific level for determination of the continuation time may, as illustrated in FIG. 3 for example, be a level M1 that is a specific percentage (for example 50%) of a level M0 of the sound volume at a start point t0. In this case, the extraction section 24 identifies a period from the start point t0 until a point t1 at which the level of the sound volume became less than M1 as the continuation time (continuation time A in FIG. 3). As another example, as illustrated in FIG. 3 for example, the specific level may be a level M2 of the sound volume immediately before the start point t0, namely, immediately before the sudden rise in the sound volume. In this case, the extraction section 24 determines as the continuation time the time from the start point t0 until a time point t2 at which the level of the sound volume becomes less than M2 (continuation time B in FIG. 3). Explanation follows below regarding a case in which a determination method for the latter continuation time is employed in the present exemplary embodiment.

The extraction section 24 compares the determined continuation time against plural continuation time threshold values $th_t$ preset according to the type of scene of interest. In cases in which any of the continuation times are the continuation time threshold value $th_t$ or longer, the extraction section 24 extracts a frame of the video data that the audio change detection section 22 detected as corresponding to the start point thereof as the first frame of a scene of interest. Moreover, based on which continuation time threshold value $th_t$ the continuation time is at, or is longer than, the extraction section 24 associates data indicating the type of that scene of interest with the extracted scene of interest.

Figure 4:
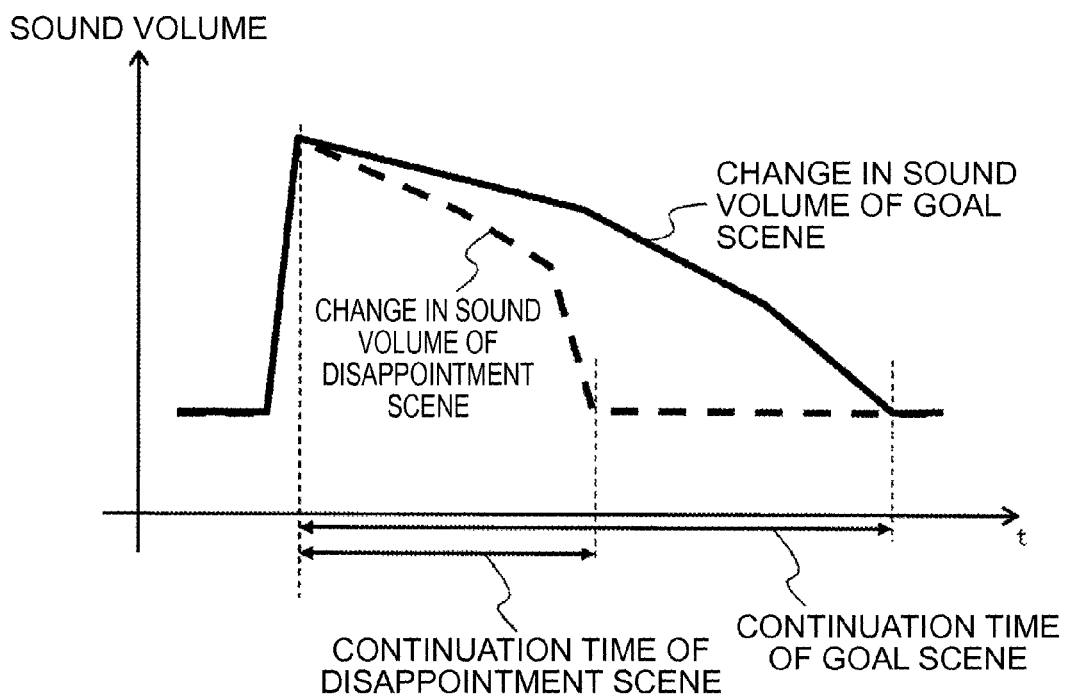
FIG. 4 is a diagram for explaining continuation times according to types of scene of interest.

For example, as illustrated in FIG. 4, in a goal scene there is a tendency for the sound volume to be at a specific level or greater for a comparatively long duration, and in disappointment scenes, there is a tendency for the sound volume to drop below the specific level more quickly compared to goal scenes. Accordingly, in cases in which a scene of interest is extracted, identification of the type thereof is enabled by setting the continuation time threshold value $th_t$ according to the types of scene of interest based on such tendencies.

For example, setting may be made such that a continuation time threshold value corresponding to a goal scene is $th_{t1}$, a continuation time threshold value corresponding to a disappointment scene is $th_{t2}$, a continuation time threshold value corresponding to an attack defense switch scene is $th_{t3}$, and a continuation time threshold value corresponding to a foul scene is $th_{t4}$. For example, $th_{t1} > th_{t2} > th_{t3} > th_{t4}$. The extraction section 24 distinguishes the extracted scene of interest to be a goal scene in cases in which the continuation time is $th_{t1}$ or longer. A disappointment scene is distinguished in cases in which the continuation time is shorter than $th_{t1}$ but is $th_{t2}$ or longer. An attack defense switch scene is distinguished in cases in which the continuation time is shorter than $th_{t2}$ but is $th_{t3}$ or longer. A foul scene is distinguished in cases in which the continuation time is shorter than $th_{t3}$ but is $th_{t4}$ or longer. Note that no scene of interest is extracted in cases in which the continuation time is shorter than $th_{t4}$.

The extraction section 24 may extract, as the start frame of the video data corresponding to the start point, a frame associated with time data the same as time data associated with the start point. For example, the start frame of the scene may be a frame associated with time data indicating a specific number of seconds earlier than a time indicated by time data associated with the start point. This thereby enables extraction from video data of a cut from a scene leading up to the scene of interest to the scene of interest.

Moreover, the extraction section 24 may also extract a frame corresponding to the end point of the continuation time as the final frame of the scene of interest.

The generation section 26 generates metadata indicating the start of the scene of interest based on the start frame extracted by the extraction section 24. Specifically, the generation section 26 generates metadata associating data indicating the start of the scene of interest with time data associated with the start frame. The generation section 26 also appends data indicating the type of scene of interest distinguished by the extraction section 24 to the metadata. Moreover, in cases in which the final frame is also extracted by the extraction section 24, the generation section 26 generates metadata indicating the end of the scene of interest based on the final frame. Note that the generation section 26 may also associate metadata to frames.

Figure 5:
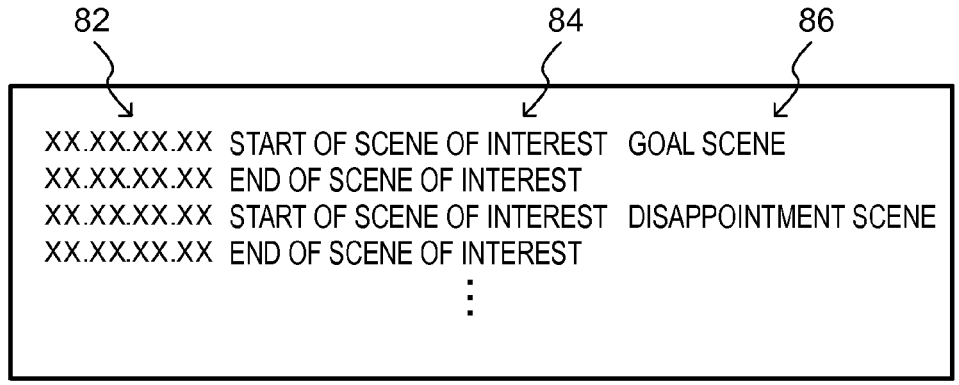
FIG. 5 is a diagram illustrating an example of a metadata file.

The generation section 26 generates a metadata file storing plural generated metadata, in the sequence of the time data contained in the metadata. The metadata file may, for example, be generated as a csv (comma-separated values) format file. FIG. 5 illustrates an example of a metadata file. In the example of FIG. 5, one item of metadata is listed in each row, with each item of metadata including time data 82, data indicating the start or end of the scene of interest (reference numeral 84), and data indicating the type of scene of interest (reference numeral 86).

Note that although explanation is given here regarding a case in which the metadata is generated using time data associated with frames, the metadata may be generated using other data that identifies each frame, such as frame numbers.

The generation section 26 appends edited footage with the generated metadata file and transmits the metadata file to distribution device 30 as metadata appended footage.

Figure 6:
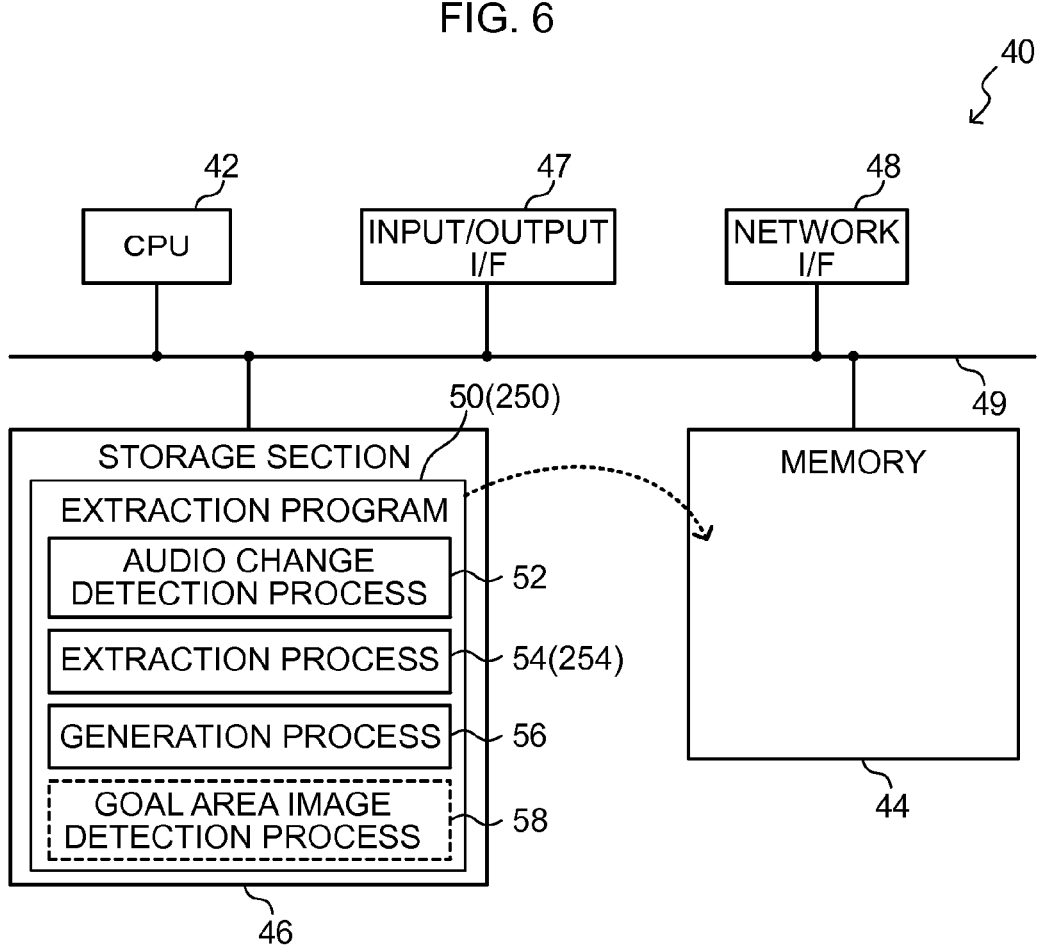
FIG. 6 is a schematic block diagram illustrating an example of a computer that functions as an extraction device.

The extraction device 20 may, for example, be implemented by a computer 40 as illustrated in FIG. 6. The computer 40 includes a CPU 42, memory 44, a non-volatile storage section 46, an input/output interface (I/F) 47, and a network I/F 48. The CPU 42, the memory 44, the storage section 46, the input/output I/F 47, and the network I/F 48 are mutually connected through a bus 49.

The storage section 46 may be implemented by a hard disk drive (HDD), flash memory, or the like. An extraction program 50 that causes the computer 40 to function as the extraction device 20 is stored in the storage section 46 that serves as a recording medium. The CPU 42 reads the extraction program 50 from the storage section 46, expands the extraction program 50 into the memory 44, and sequentially executes the processes included in the extraction program 50.

The extraction program 50 includes an audio change detection process 52, an extraction process 54, and a generation process 56. The CPU 42 operates as the audio change detection section 22 illustrated in FIG. 1 by executing the audio change detection process 52. The CPU 42 also operates as the extraction section 24 illustrated in FIG. 1 by executing the extraction process 54. The CPU 42 also operates as the generation section 26 illustrated in FIG. 1 by executing the generation process 56. The computer 40 executing the extraction program 50 thereby functions as the extraction device 20.

Figure 7:
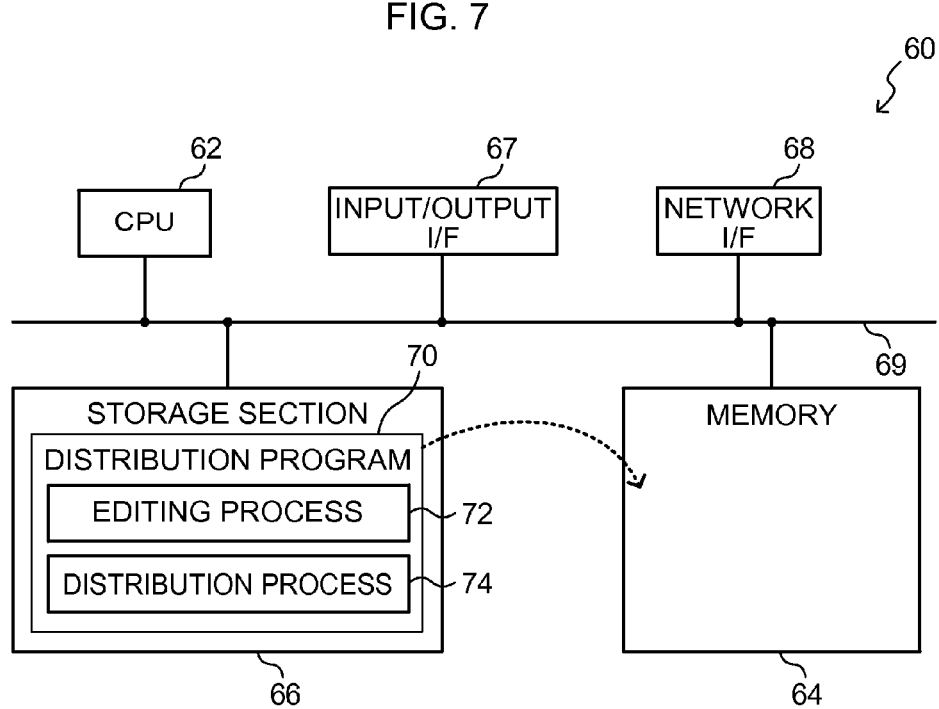
FIG. 7 is a schematic block diagram illustrating an example a computer that functions as a distribution device.

The distribution device 30 may be implemented by, for example, a computer 60 illustrated in FIG. 7. The computer 60 includes a CPU 62, memory 64, a non-volatile storage section 66, an input/output I/F 67, and a network I/F 68. The CPU 62, the memory 64, the storage section 66, the input/output I/F 67, and the network I/F 68 are mutually connected through a bus 69. Moreover, a display device and an input device, not illustrated in the drawings, are connected to the computer 60 through the input/output I/F 67.

The distribution device 30 and the extraction device 20 are connected through the network I/F 68 of the distribution device 30, the network, and the network I/F 48 of the extraction device 20.

The storage section 66 may be implemented by a HDD, flash memory, or the like. A distribution program 70 that causes the computer 60 to function as the distribution device 30 is stored in the storage section 66 that serves as a recording medium. The CPU 62 reads the distribution program 70 from the storage section 66, expands the distribution program 70 into the memory 64, and sequentially executes the processes included in the distribution program 70.

The distribution program 70 includes an editing process 72 and a distribution process 74. The CPU 62 operates as the editing section 32 illustrated in FIG. 1 by executing the editing process 72. The CPU 62 also operates as the distribution section 34 illustrated in FIG. 1 by executing the distribution process 74. The computer 60 executing the distribution program 70 thereby functions as the distribution device 30.

The extraction device 20 and the distribution device 30 may each be implemented by, for example, a semiconductor integrated circuit, and more specifically by an application specific integrated circuit (ASIC) or the like.

Explanation next follows regarding operation of the footage distribution system 10 according to the first exemplary embodiment. When the distribution device 30 is input with captured footage, the distribution device 30 executes editing processing illustrated in FIG. 8, and outputs edited footage. Next, when the extraction device 20 is input with the edited footage, the extraction device 20 executes extraction processing illustrated in FIG. 9, and outputs metadata appended footage. Then, when the distribution device 30 is input with the metadata appended footage, the distribution device 30 executes distribution processing illustrated in FIG. 10, and outputs distribution footage. Each type of processing is described in detail below.

Figure 8:
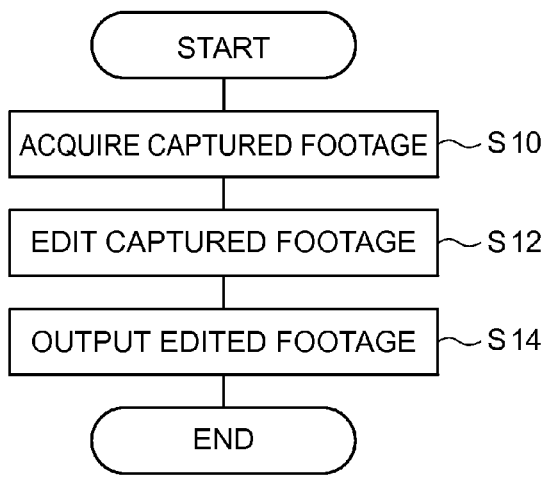
FIG. 8 is a flowchart illustrating an example of editing processing.

First, at step S10 of the editing processing illustrated in FIG. 8, the editing section 32 acquires captured footage. Next, at step S12, the editing section 32 applies editing instructions instructed by operation of an operator using the display device and the input device, not illustrated in the drawings, to each frame of the video data included in the captured footage, using image processing. Next, at step S14, the editing section 32 transmits the edited footage to the extraction device 20, and editing processing ends.

Figure 9:
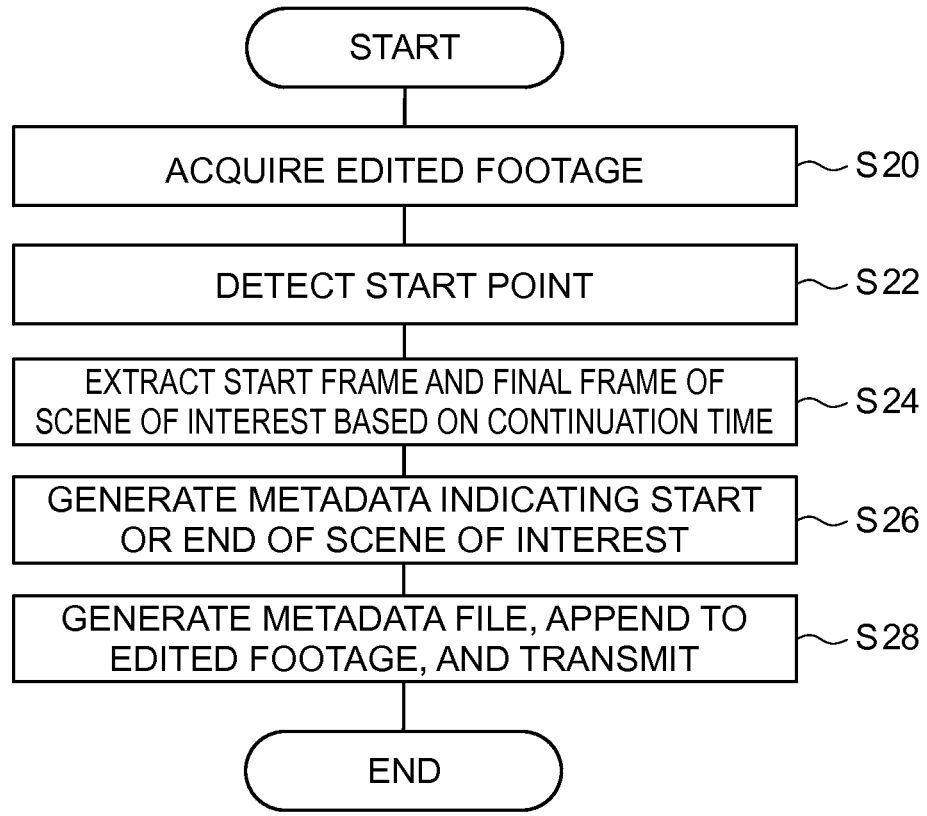
FIG. 9 is a flowchart illustrating an example of extraction processing of the first exemplary embodiment.

Next, at step S20 of the extraction processing illustrated in FIG. 9, the audio change detection section 22 acquires the edited footage transmitted from the distribution device 30.

Next, at step S22 the audio change detection section 22 calculates changes in the sound volume level of the audio data included in the acquired edited footage. For example, the audio change detection section 22 calculates, as the sound volume change amount, a difference, or a ratio, between an average value of the sound volume level at respective sampling points included in a specific interval, and an average value of the sound volume level at respective sampling points included in a specific interval immediately before. The audio change detection section 22 then detects as start points, points in time (sampling points) at which the calculated amount of change in the sound volume exceeds a predetermined change amount threshold value $th_c$.

Next, at step S24, the extraction section 24 determines the continuation time for which the sound volume is continually the specific level or greater from the start point detected by the audio change detection section 22. Next, the extraction section 24 compares the determined continuation time with the plural continuation time threshold values $th_t$ preset according to the types of scene of interest. Then, in cases in which the continuation time is at one of the continuation time threshold values $th_t$ or longer, the extraction section 24 extracts a frame of the video data corresponding to the start point as the start frame of the scene of interest of the type distinguished from the relationship between the continuation time and the continuation time threshold values $th_t$. Moreover, the extraction section 24 extracts a frame of the video data corresponding to the end point of the continuation time as the final frame of the scene of interest.

Next, at step S26, the generation section 26 generates metadata associating data indicating the start of the scene of interest with time data associated with the start frame extracted by the extraction section 24. Moreover, data indicating the type of scene of interest distinguished by the extraction section 24 may also be added to the metadata. Moreover, the generation section 26 generates metadata associating data indicating the end of the scene of interest with time data associated with the end frame extracted by the extraction section 24.

Next, at step S28, the generation section 26 generates a metadata file storing the plural metadata generated at step S26 above in the sequence of the time data included in the metadata. The generation section 26 then appends the generated metadata file to the edited footage, and transmits the edited footage to the distribution device 30 as metadata appended footage, and extraction processing ends.

Figure 10:
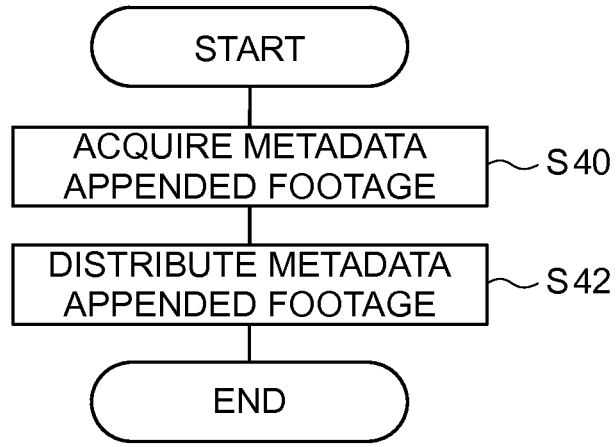
FIG. 10 is a flowchart illustrating an example distribution processing.

Next, at step S40 of the distribution processing illustrated in FIG. 10, the distribution section 34 acquires the metadata appended footage transmitted from the extraction device 20. Next, at step S42, the distribution section 34 converts the metadata appended footage to distribution footage according to the specified standard, and distributes the distribution footage to the distribution destination terminal (omitted from illustration in the drawings), and distribution processing ends.

As explained above, according to the extraction device 20 according to the first exemplary embodiment, start points at which there is a sharp rise in sound volume are detected from audio data included in footage captured of the soccer game, and a continuation time of the sound volume being a specific level or above is determined from the start point onward. Then, in cases in which the continuation time is the specific threshold value or longer, a frame of the video data corresponding to the start point is extracted as the start frame of the scene of interest. This thereby enables the mistaken extraction, as scenes of interest, of parts at which sound volume rises sharply due to loud speech unexpectedly delivered by a commentator or live report, the sound of a whistle by the referee, or the like, unrelated to scenes of interest, to be prevented, and enables the extraction of desired scenes of interest.

Note that although explanation has been given of a case in which plural of the continuation time threshold value $th_t$ are set in the first exemplary embodiment, and scenes of interest are extracted according to the type of scene of interest, there is no limitation thereto. For example, a single continuation time threshold value $th_t$ may be set alone, and a scene of interest may be extracted in cases in which a continuation time is the continuation time threshold value $th_t$ or longer, without identification of the type.

Moreover, although explanation has been given regarding a case in which the target sport is soccer in the first exemplary embodiment, there is no limitation thereto. There is, for example, applicability to captured footage of other sports displaying a tendency for the sound volume to be continuously at a specific level or greater for a specific period or longer after a sharp rise in sound volume at scenes of interest, as in games such as rugby, American football, and baseball. The change amount threshold value $th_c$ for detecting sharp rises in sound volume, and the continuation time threshold value $th_t$ for determining continuation times of sharply risen sound volume, may be set as appropriate for the sport to which application is made.

Figure 11:
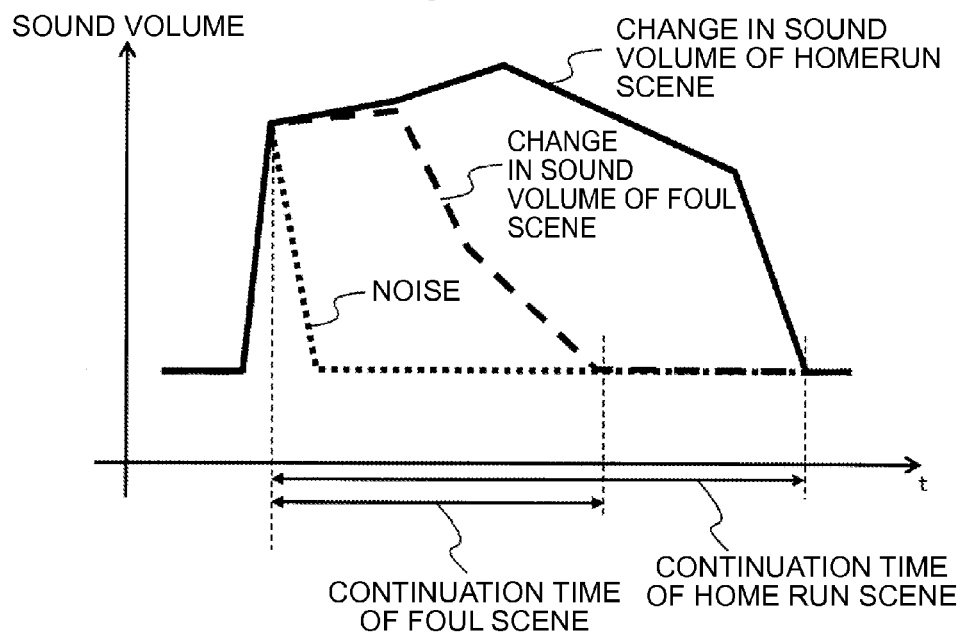
FIG. 11 is a diagram for explaining continuation times according to type of scene of interest in baseball.

For example, in the case of baseball, cheering increases at the instant a batter strikes the ball, and the cheering is continuous for a specific period or longer according to the direction of the batted ball. Moreover, continuation times of cheering differ according to batting outcomes such as homeruns, fouls, hits, and outs. For example, in the case of a homerun, there is a tendency for cheering that increased at the instant of the hitting to rise further at the instant when the ball enters the stands, and for the continuation until the batter returns from a homerun to be a continuation time longer than in cases of, for example, another batting outcome such as a foul. An example of this tendency is illustrated by changes in sound volume in FIG. 11. Note that cases of sound volume rising unexpectedly (noise) not at a scene of interest, are similar to in the above exemplary embodiment in that sharp rises in sound volume do not continue thereafter. This tendency may be utilized by setting the continuation time threshold value $th_t$ corresponding to a homerun (for example to 10 seconds), and extracting a homerun scene as the exciting scene. Moreover, the continuation time threshold value $th_t$ may be set to correspond to another batting result such that extraction is performed for scenes of interest according to batting results. Moreover, in consideration that the time from when the batter hits the ball until the ball enters the stands changes according to the ballpark dimensions, the continuation time threshold value $th_t$ may be set with respect to the ballpark in which the game is held, specifically, for example, according to the dimensions of the ballpark.

Figure 12:
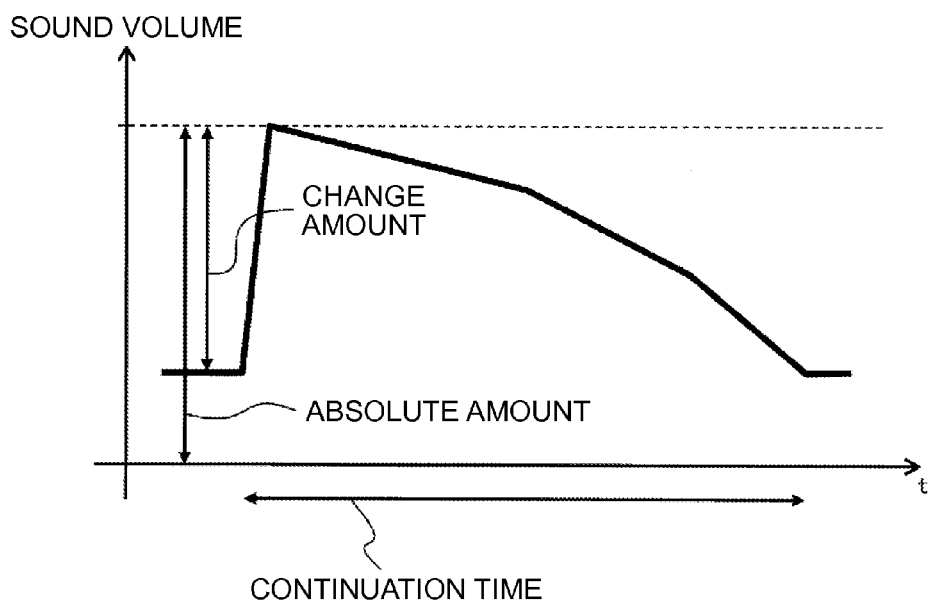
FIG. 12 is a diagram for explaining absolute amount of sound volume.

Explanation has been given in the first exemplary embodiment regarding a case in which the start point is detected based on change amounts in sound volume, and a specific level is determined for determination of the continuation time based on the sound volume at the start point or on the change amount of the sound volume compared to before the start point. However, there is no limitation thereto. As illustrated in FIG. 12, the absolute amount of the sound volume may be employed in a combination. For example, configuration may be made such that the start point is detected in cases in which the change amount in the sound volume is the change amount threshold value $th_c$ or greater, and the absolute amount (level) of the sound volume is a start absolute amount threshold value $tht_{a1}$ or greater. Moreover, configuration may be made such that continuation times are determined by determination as to whether or not the absolute amount of the sound volume is continuous at a continuous absolute amount threshold value $tht_{a2}$ or greater for a specific period or longer. The precision of extraction of scenes of interest is thereby increased.

Second Exemplary Embodiment

Explanation next follows regarding a second exemplary embodiment. Note that parts that are similar to those of the footage distribution system 10 according to the first exemplary embodiment are appended with the same reference numerals, and detailed explanation is omitted thereof.

Figure 13:
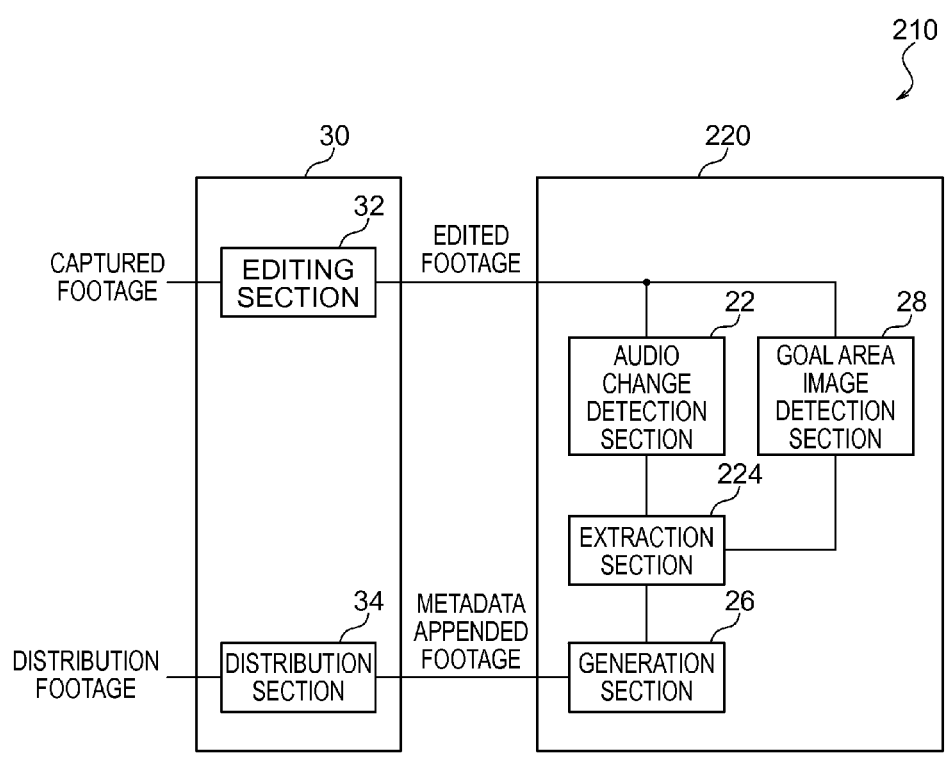
FIG. 13 is a functional block diagram illustrating a schematic configuration of a footage distribution system according to a second exemplary embodiment.

As illustrated in FIG. 13, a footage distribution system 210 according to the second exemplary embodiment includes an extraction device 220 and a distribution device 30. The extraction device 220 includes an audio change detection section 22, a goal area image detection section 28, an extraction section 224, and a generation section 26.

The goal area image detection section 28 acquires the edited footage transmitted from the distribution device 30, and detects frames representing images capturing a goal area (referred to as "goal area images" hereafter) from each frame of the video data included in the edited footage. Specifically, the goal area image detection section 28 extracts an image characteristic from each frame. The image characteristic is a characteristic represented by pixel data, such as brightness and color, of each pixel in the frame. The goal area image detection section 28 then derives a degree of similarity between a reference image characteristic, representing a pre-prepared goal area image, and the extracted image characteristic extracted from each frame of the edited footage. The goal area image detection section 28 detects as frames representing goal area images frames with an extracted image characteristic having a degree of similarity to the reference image characteristic of a specified value or above.

Figure 14:
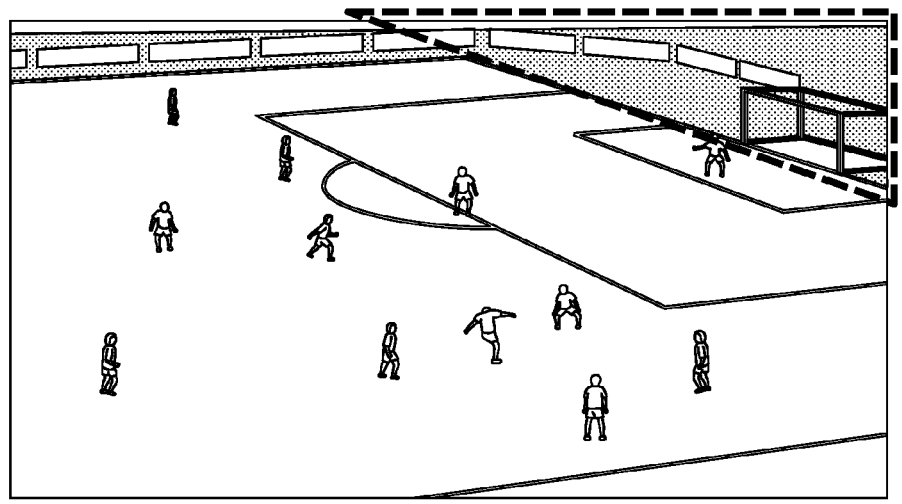
FIG. 14 is a diagram illustrating an example of a goal area image.

More specifically, the goal area image is, for example, an image such as that illustrated in FIG. 14, and has a characteristic such as a goal post being present in a portion of the image and there being a group of pixels of a color different from the color of the pitch in a corner portion of the image (inside the dashed line in FIG. 14). Accordingly, the goal area image detection section 28, for example, excludes pixels representing the color of the pitch (green) based on color data of the pixels in each of the frames. Moreover, pixels are grouped based on color data, and small regions in which the number of pixels included in the group is a specific number or fewer, are excluded as regions representing players. Then, a frame is detected as a goal area image in cases in which a characteristic represented by a position and shape of the remaining regions, and colors of the pixels included in the remaining regions indicate, for example, a characteristic of a group of pixels of a color different from the color of the pitch at a corner portion of the image, as illustrated inside the dashed line in FIG. 14.

Figure 15:
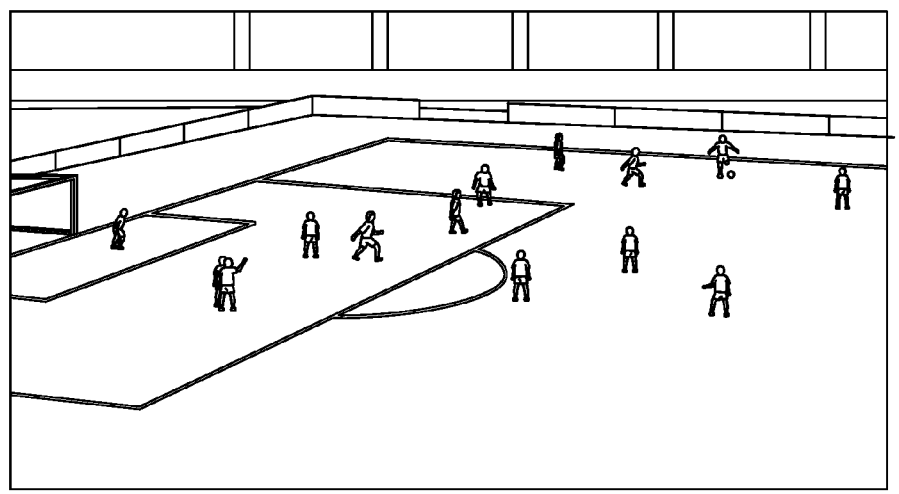
FIG. 15 is a diagram illustrating an example of a goal area image.

The goal area image detection section 28 may determine whether or not each frame is a goal area image by pattern matching of the shape of a goal post, a line in front of the goal post, or the like. Although FIG. 14 illustrates a goal area image representing the goal area at the right side of the screen, goal area images representing the goal area at the left side of the screen, as illustrated in FIG. 15, are detected similarly. Note that the detection of the goal area image based on the groups of pixels of a different color from the color of the pitch, and the detection of goal area images based on pattern matching of the shape of a goal post, a line in front of the goal post, or the like, explained above, may be employed in combination with each other.

As the image characteristic, the goal area image detection section 28 may employ a characteristic representing a structure (composition) of an image, a characteristic representing a placement or distribution of, for example, color and brightness of an image, a characteristic obtained by wavelet transformation of an image, or the like. In cases in which such an image characteristic is extracted, it may be extracted from the entirety of each frame, or the characteristic may be extracted from a portion of each frame.

The extraction section 224, similarly to the extraction section 24 of the first exemplary embodiment, determines a continuation time in which a sound volume of a specific level or greater is continuous from the start point detected by the audio change detection section 22. Then, the extraction section 224 determines whether or not the determined continuation time is, or is greater than, the continuation time threshold value $th_t$ preset for extraction of goal scenes.

Figure 16:
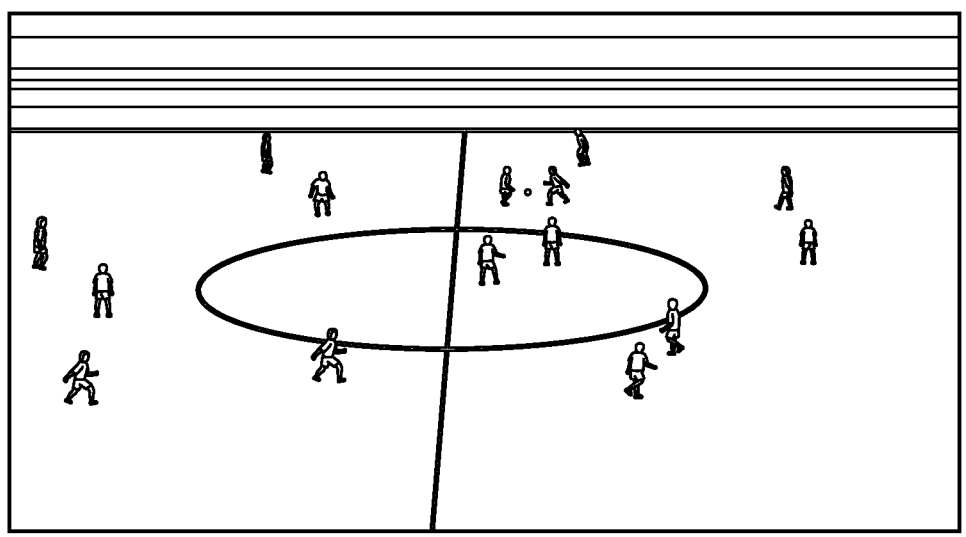
FIG. 16 is a diagram illustrating an example of an image other than a goal area image.

Images in these goal scenes are generally goal area images as illustrated in FIG. 14 or FIG. 15. For example, as illustrated in FIG. 16, there are cases in which excitement, such as cheering, rises when the image is of a central area of the pitch, and this may be considered a scene of interest of another type than a goal scene. Namely, even when a continuation time determined from a change in sound volume is the continuation time threshold value $th_t$ or longer, it is possible to determine that that scene is not a goal scene when the image representing the corresponding frame is not a goal area image.

Thus, the extraction section 224 determines whether or not a frame detected as a goal area image by the goal area image detection section 28 is included in at least a portion of the frames of the video data corresponding to from the start point until the continuation time ends. In cases in which the continuation time is the continuation time threshold value $th_t$ or longer and includes a goal area image, the extraction section 224 extracts a frame of the video data corresponding to the start point as the start frame of a scene of interest.

Moreover, the extraction section 224 may extract the final frame of the scene of interest corresponding to the end time point of the continuation time, similarly to the extraction section 24 of the first exemplary embodiment.

The extraction device 220 may be implemented by, for example, the computer 40 illustrated in FIG. 6, similarly to in the first exemplary embodiment. An extraction program 250 that causes the computer 40 to function as the extraction device 220 is stored in the storage section 46 serving as a recording medium. The CPU 42 reads the extraction program 250 from the storage section 46, expands the extraction program 250 into the memory 44, and sequentially executes the processes included in the extraction program 250.

The extraction program 250 includes an audio change detection process 52, a goal area image detection process 58, an extraction process 254, and the generation process 56. The CPU 42 operates as the goal area image detection section 28 illustrated in FIG. 13 by executing the goal area image detection process 58. The CPU 42 also operates as the extraction section 224 illustrated in FIG. 13 by executing the extraction process 254. The other processes are similar to those of the first exemplary embodiment. The computer 40 executing the extraction program 250 thereby functions as the extraction device 220.

Explanation next follows regarding the operation of the footage distribution system 210 according to the second exemplary embodiment. In the second exemplary embodiment, since only the extraction processing executed by the extraction device 220 is different from the first exemplary embodiment, explanation follows regarding the extraction processing in the second exemplary embodiment with reference to FIG. 17. Note that processing similar to the extraction processing of the first exemplary embodiment is appended with the same reference numerals and detailed explanation is omitted thereof.

Figure 17:
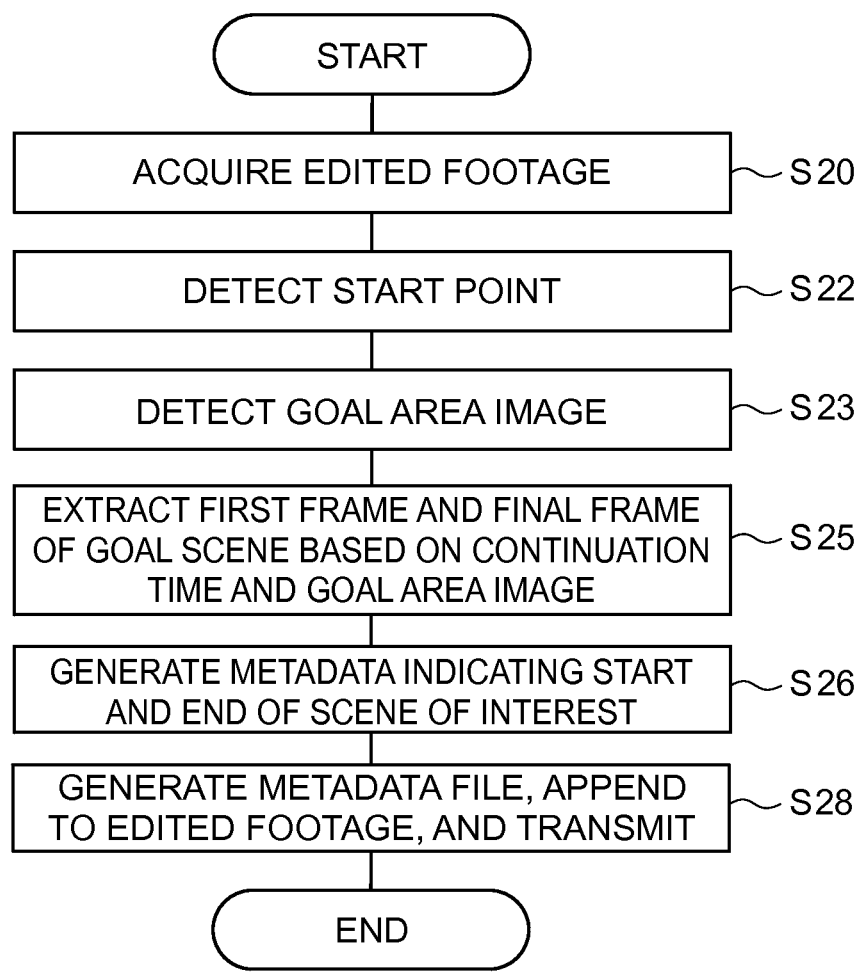
FIG. 17 is a flowchart illustrating an example of extraction processing in the second exemplary embodiment.

At step S20 and step S22 of the extraction processing illustrated in FIG. 17, the audio change detection section 22 detects the start point from audio data corresponding to the edited footage. Next, at step S23, the goal area image detection section 28 extracts an image characteristic for respective frames of the video data, and detects a frame representing a goal area image by comparing this to a reference image characteristic representing a pre-prepared goal area image.

Next, at step S25, the extraction section 224 determines whether or not a continuation time, in which a sound volume of a specific level or greater is continuous from the start point detected by the audio change detection section 22, is the continuation time threshold value $th_t$ set for extracting goal scenes, or longer. Moreover, the extraction section 224 determines whether or not at least a portion of the frames of the video data corresponding to from the start point to the end of the continuation time include a frame detected as a goal area image by the goal area image detection section 28. In cases in which the continuation time is the continuation time threshold value $th_r$ or longer, and includes a goal area image, the extraction section 224 extracts the frame of the video data corresponding to the start point as the start frame of a scene of interest.

Subsequent processing is performed similarly to the extraction processing of the first exemplary embodiment, and the extraction processing ends.

As explained above, according to the second exemplary embodiment, the goal area image detection results are utilized by the extraction device 220 in extraction of scenes of interest. This thereby enables mistaken extraction of other types of scenes of interest to be prevented when extracting goal scenes as scenes of interest, enabling goal scenes to be extracted with good precision.

Each of the exemplary embodiments above enables easy location of a desired scene of interest from sports game footage (the captured footage, or the edited footage) based on metadata when employing metadata appended footage in which the metadata indicating the scene of interest extracted has been appended. Moreover during footage distribution, for example, a supplementary service, such as transmission of email to a user, may be performed automatically coordinated with scenes of interest based on the metadata.

Although explanation has been given of examples in which a footage distribution system includes a distribution device and an extraction device in each of the exemplary embodiments above, there is no limitation thereto. Each of the functional sections of the distribution device, and each of the functional sections of the extraction device may be implemented by a single computer.

Although explanation has been given of cases in which footage appended with metadata, generated by the extraction device and indicating scenes of interest, is distributed by the distribution device in each of the exemplary embodiments above, there is no limitation thereto. For example, metadata appended footage may be saved as a large volume archive, and the desired scenes of interest alone extracted and output based on the metadata.

The output from the extraction device may also be employed in applications other than footage distribution systems.

Although explanation has been given above of modes in which the extraction programs 50 and 250 are pre-stored (installed) on the storage section 46, and the distribution program 70 is pre-stored (installed) on the non-volatile storage section 66, they may be provided in a format recorded on a recording medium such as a CD-ROM or a DVD-ROM.

One aspect exhibits the advantageous effect of enabling extraction of scenes of interest from captured footage of a sports game.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention.

Although one or more embodiments of the technology disclosed herein have been described in detail, it should be understood that the various changes, substitutions, and alterations could be made hereto without departing from the spirit and scope of the invention.

What is claimed is:

1. A non-transitory recording medium storing an extraction program that causes a computer to execute a process, the process comprising:
    comparing a continuation time, the continuation time being a time that a sound volume level of audio data included in footage including the audio data and video data is greater than a predetermined level, with a plurality of predetermined threshold values, each of the plurality of predetermined threshold values corresponding to at least one of a plurality of types of interest scenes, respectively;
    matching the continuation time with one of the plurality of predetermined threshold values;
    extracting a portion of the video data that corresponds to the continuation time; and
    determining a type of interest scene of the extracted video from the plurality of types of interest scenes based on the continuation time and the matched predetermined threshold value.

2. The non-transitory recording medium of claim 1, wherein, in the process, if the determined interest scene is soccer, a video data portion including a goal scene is identified when the continuation time matches a threshold value which corresponds to a goal scene.

3. The non-transitory recording medium of claim 2, the process further comprising:
    detecting, from each of a plurality frames included in the extracted portion of the video data, a frame capturing a goal area based on an image characteristic in the plurality of respective frames, wherein
    frames corresponding to the continuation time, are identified as a video data portion including a goal scene, in cases in which the continuation time is the threshold value set based on the goal scene or longer and a frame capturing the goal area is included in the frames corresponding to the continuation time.

4. The non-transitory recording medium of claim 3, wherein, in the process, frames including a specific area or greater of a region other than a pitch are detected as frames capturing the goal area based on the image characteristic extracted from the frame.

5. The non-transitory recording medium of claim 1, wherein, in the process, an absolute amount of sound volume is also employed in detection of the continuation time.

6. The non-transitory recording medium of claim 1, wherein, in the process, when identifying the video data portion including the interest scene, a frame associated with time data at a specific number of seconds earlier than a start of the continuation time, is designated as a start frame of the video data portion including the interest scene.

7. The non-transitory recording medium of claim 1, wherein the process further comprises generating metadata indicating that the identified video data portion is a video data portion including an interest scene.

8. An extraction method, comprising:
    comparing a continuation time, the continuation time being a time that a sound volume level of audio data included in footage including the audio data and video data is greater than a predetermined level, with a plurality of predetermined threshold values, each of the plurality of predetermined threshold values corresponding to at least one of a plurality of types of interest scenes, respectively;

matching the continuation time with one of the plurality of predetermined threshold values:

extracting a portion of the video data that corresponds to the continuation time; and determining a type of interest scene of the extracted video from the plurality of types of interest scenes based on the continuation time and the matched predetermined threshold value.

9. The extraction method of claim 8, wherein, if the determined interest scene, a video data portion including a goal scene is identified when the continuation time matches a threshold value, which corresponds to a goal scene.

10. The extraction method of claim 9, further comprising:

detecting, from each of a plurality frames included in the extracted portion of the video data, a frame capturing a goal area based on an image characteristic in the plurality of respective frames, wherein frames corresponding to the continuation time, are identified as a video data portion including a goal scene, in cases in which the continuation time is the threshold value set based on the goal scene or longer and a frame capturing the goal area is included in the frames corresponding to the continuation time.

11. The extraction method of claim 10, wherein frames including a specific area or greater of a region other than a pitch are detected as frames capturing the goal area based on the image characteristic extracted from the frame.

12. The extraction method of claim 8, wherein an absolute amount of sound volume is also employed in detection of the continuation time.

13. The extraction method of claim 8, wherein, when identifying the video data portion including the interest scene, a frame associated with time data at a specific number of seconds earlier than a start of the continuation time, is designated as a start frame of the video data portion including the interest scene.

14. An extraction device, comprising:

at least one processor configured to execute a process, the process comprising:

comparing a continuation time, the continuation time being a time that a sound volume level of audio data included in footage including the audio data and video data is greater than a predetermined level, with a plurality of predetermined threshold values, each of the plurality of predetermined threshold values corresponding to at least one of a plurality of types of interest scenes, respectively;

matching the continuation time with one of the plurality of predetermined threshold values;

extracting a portion of the video data that corresponds to the continuation time; and determining a type of interest scene of the extracted video from the plurality of types of interest scenes based on the continuation time and the matched predetermined threshold value.

* * * * *